March 8, 1932.  A. BARÉNYI  1,848,926
PHOTOGRAPHIC SHUTTER
Filed Aug. 13, 1930
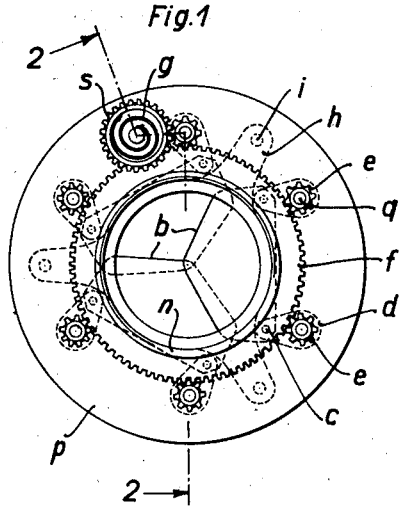
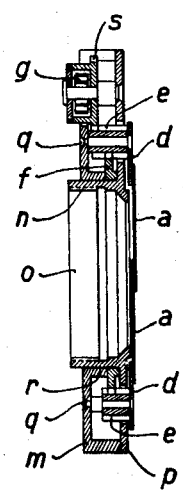
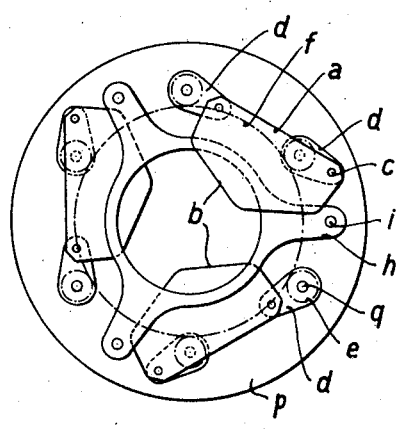
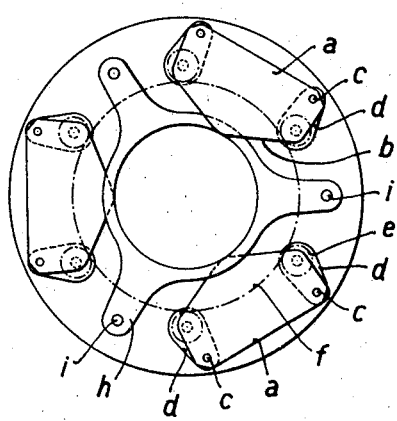
Inventor
Árpád Barényi
by Frank Reichow
Attorney Patented Mar. 8, 1932

1,848,926

UNITED STATES PATENT OFFICE

ÁRPÁD BARÉNYI, OF BERLIN-LICHTERFELDE, GERMANY

PHOTOGRAPHIC SHUTTER

Application filed August 13, 1930, Serial No. 474,988, and in Germany October 25, 1929.

My invention relates to improvements in photographic shutters, and more particularly in shutters of the type in which the blades have reciprocating movement for opening and closing the shutter. The object of the improvements is to provide a shutter of this type in which the aperture of the shutter is with substantial uniformity opened from the central to marginal parts thereof, and with this object in view my invention consists in constructing the shutter blades and the actuating mechanism thereof so that in the closed position of the shutter the blades overlap each other with a lap of substantially uniform breadth, extending from the central to the marginal parts of the aperture of the shutter, the shutter blades being moved away from one another for opening the shutter transversely of the said laps and at equal velocities at all points of the lap. Thus the overlapping edges of the shutter blades produce apertures for the passage of the light rays which from the beginning of the opening operation extend with approximate uniformity from the center of the aperture to the margin thereof.

In the preferred embodiment of the invention the blades are made in the form of sectors, each sector being connected at both ends to cranks which perform one complete rotation for each complete opening and closing movement of the shutter.

For the purpose of explaining the invention an example embodying the same has been shown in the accompanying drawings, in which the same reference characters have been used in all the views to indicate corresponding parts. In said drawings Fig. 1 is a front elevation of the shutter and with the front part of the casing removed, Fig. 2 is a sectional elevation taken on the line 2—2 of Fig. 1, Fig. 3 is a rear elevation, viewed from the right in Fig. 2 and showing the shutter blades half open, and Fig. 4 is a similar rear elevation, showing the shutter completely open.

In the example shown in the figures the shutter comprises an annular casing $m$ provided with a central drum $n$ having an aperture $o$ through which the light may pass to the lens system (not shown), the imaginary axis of the drum coinciding with the axis of the lens system. The drum $n$ is formed with a flange $p$, by means of which it is fixed to the casing $m$. In the example shown in the figures, the shutter comprises three sector-shaped blades $a$ the edges $b$ each of which are disposed at an obtuse angle one to the other. In the closed shutter the overlapping of the edges is substantially uniform in breadth from the center of the aperture to the margin thereof. In this instance, the number of blades being three, the value of the angle to which the edges $b$ of each blade are formed is approximately one third of 360°: that is, approximately, 120° As a matter of practical detail, this angle is slightly greater than 120°, and, accordingly (as clearly appears in Fig. 1), the overlap of the blades, when the shutter is closed, is slightly greater at the periphery of the aperture $o$ than at the center. Subject to this small modification (the reason for which is not now important), the proximate edges of the adjacent blades are parallel, the overlap of the closed blades is of equal extent from center to periphery of the aperture, and, in shutter opening, the space between receding blades is of equal width from the medial to the peripheral portion of the aperture.

Each blade is mounted on two crank-arms $d$ and the pivotal connections (at $c$) of the two crank-arms to the blade are at symmetrical points at the two sides of the blade. The cranks are fixed to pinions $e$ rotatably mounted on pivot-bolts $q$ secured to the wall of the casing $m$, and the said pinions are in mesh with a toothed ring $f$ rotatably mounted on the drum $n$ between the flange $p$ thereof and a rim $r$ of the wall of the casing $m$. The pinions are driven from a suitable actuating mechanism such as a spring-driven motor or master member $g$, the teeth $s$ of which are in mesh with one of the pinions $e$.

The operation of the shutter mechanism is as follows:

For making an exposure the toothed ring $f$ is rotated through a range sufficient to impart a complete rotation to each pinion $e$ and to the crank-arm $d$ secured thereto. The two crank-arms connected to each blade are of equal length and extend in parallelism to each other, and, therefore, when by rotation of the crank-arms the blades are moved, the successive positions of the edges $b$ of each blade are parallel positions, and each point of the blade is moved through a circle, the radius of which is equal to the radius of the crank arms $d$. That is to say, the blades being grouped symmetrically with respect to the center of the aperture $o$, blade movement is a planetary movement with respect to the center of that aperture. Therefore blade movement has a radial component and a lateral component as well, and the proximate edges $b$ of adjacent blades, shaped and arranged in approximate parallelism when the shutter is closed, continue in parallelism throughout the range of blade movement. Thus, when in the opening of the shutter the proximate edges $b$ of two blades separate, the marginal portions of the aperture of the shutter are opened in approximately the same degree as the central portions thereof, whereby the optical efficiency is improved.

For example, in a shutter the aperture of which has a diameter of 29 millimeters or a cross-sectional area of 660.50 square millimeters one half of the opening operation opens an area of 450 square millimeters, while in shutter constructions now in use in which the blades are pivotally mounted on a stationary pivot bolt the same partial operation of the shutter opens only 288 square millimeters of the area of the aperture, so that in my shutter the efficiency is increased by 28%. The efficiency of the shutter is further improved by virtue of the fact that at the beginning of the closing swing of the blades (Fig. 4) the crank-arms $d$ are passing through their outer dead centers. They, therefore, at this part of their rotation, are imparting only slight radial movements to the blades. Consequently, at first only the small points of the blades move into and encroach upon the field of sight. In shutters in which the blades are rockingly mounted on fixed pivot-bolts, large portions of the blades pass into the field of sight at the beginning of the closing operation.

The blades being moved in the manner described, guiding members may be provided to prevent impingement of the blades upon each other, edge to edge, when closing. In the example shown in the figures, such guiding means are in the form of superposed very thin rings $h$, fixed by arms $i$ to the flange $p$. The blades are mounted so that one of them is located between the flange $p$ and the first ring $h$, the second one between the said rings, and the third one outside the second ring and between the same and the cover of the casing. The outer diameter of the said rings is such that when the shutter is open the points of the blades overlap the said ring, as is shown in Fig. 4.

While in describing the invention reference has been made to an example comprising three sector-shaped blades I wish it to be understood that my invention is not limited to this feature, and that the invention may also be embodied in shutters having two blades, or more than three blades.

I claim:

1. A photographic shutter including an apertured casing, a plurality of blades mounted in said casing and symmetrically disposed with respect to the aperture thereof, and means for moving the blades symmetrically in planetary courses relatively to the center of such aperture.

2. A photographic shutter, comprising an apertured casing, a plurality of blades mounted in said casing and constructed for overlapping one another when in closed position with laps of substantially equal breadth extending from a median part of the aperture to the circumference thereof and blade-actuating mechanism comprising rotary members, one for each of two spaced points of each blade, adapted to impart to the said blades planetary movement with respect to the center of such aperture.

3. A photographic shutter, comprising blades constructed for overlapping one another when in closed position with laps of substantially equal breadth extending from a median part of the aperture of the shutter to the circumference thereof, and blade-actuating mechanism comprising rotary cranks one for each of two spaced points of each blade for opening and closing said blades, and means for rotating said cranks upon each operation of the shutter mechanism through a complete circle.

4. A photographic shutter, comprising blades constructed for overlapping one another when in closed position with laps of substantially equal breadth extending from a median part of the aperture of the shutter to the circumference thereof, and blade-actuating mechanism comprising rotary cranks one for each of two spaced points of each blade for imparting opening and closing movement thereto, pinions carrying said cranks, a gear-wheel in driving engagement with said pinions, and mechanism for rotating said gear-wheel through an angle for imparting complete rotation to said pinions.

5. A photographic shutter, comprising blades constructed for overlapping one another when in closed position with laps of substantially equal breadth extending from a median part of the aperture of the shutter to the circumference thereof, and blade-actuating mechanism adapted to move each blade transversely of its lap at uniform velocity all over the length of the lap for opening and closing the shutter, and guide rings between said blades.

6. A photographic shutter, comprising an apertured casing, a plurality of blades in the form of sectors mounted in said casing and constructed for overlapping one another when in closed position with laps of substantially equal breadth extending from a median part of such aperture to the circumference thereof, and blade-actuating mechanism adapted to move each blade in planetary course relative to the center of such aperture.

In testimony whereof I hereunto affix my signature.

ÁRPÁD BARÉNYI.